(12) United States Patent
Carroll, III et al.

(10) Patent No.: US 6,679,967 B1
(45) Date of Patent: Jan. 20, 2004

(54) METHOD FOR MAKING A MODULAR ENERGY-ABSORBING ASSEMBLY

(75) Inventors: Phillip Patrick Carroll, III, Bloomfield Hills, MI (US); Joel Matthew Cormier, Ferndale, MI (US)

(73) Assignee: Oakwood Energy Management, Inc., Dearborn, MI (US)

( * ) Notice: Subject to any disclaimer, the term of this patent is extended or adjusted under 35 U.S.C. 154(b) by 195 days.

(21) Appl. No.: 09/617,691

(22) Filed: Jul. 17, 2000

Related U.S. Application Data (63) Continuation-in-part of application No. 09/328,196, filed on Jun. 8, 1999, now Pat. No. 6,199,942, which is a continuation-in-part of application No. 09/018,666, filed on Feb. 4, 1998, now Pat. No. 6,017,084.

(51) Int. Cl.[7] .................................... B29C 45/14
(52) U.S. Cl. ................ 156/222; 264/553; 264/550; 264/516; 264/511
(58) Field of Search ................ 264/553, 550, 264/516, 511; 156/222

(56) References Cited

U.S. PATENT DOCUMENTS

| | | |
|---|---|---|
| 2,275,575 A | 3/1942 | Vrooman |
| 2,346,161 A | 4/1944 | Grant |
| 2,349,907 A | 5/1944 | Kos et al. |
| 3,018,015 A | 1/1962 | Agriss et al. |
| 3,088,539 A | 5/1963 | Mathues et al. |
| 3,195,686 A | 7/1965 | Johnson |
| 3,231,454 A | 1/1966 | Williams |
| 3,575,781 A | 4/1971 | Pezely |
| 3,684,235 A | 8/1972 | Schupbach |
| 3,837,991 A | 9/1974 | Evans |
| 3,853,221 A | 12/1974 | Boyd |
| 3,871,636 A | 3/1975 | Boyle |
| 3,926,463 A | 12/1975 | Landwehr et al. |
| 3,933,387 A | 1/1976 | Salloum et al. |
| 3,997,207 A | 12/1976 | Norlin |
| 4,022,505 A | 5/1977 | Saczawa, Jr. |
| 4,029,350 A | 6/1977 | Goupy et al. |
| 4,190,276 A | 2/1980 | Hirano et al. |
| 4,321,989 A | 3/1982 | Meinzer |
| 4,352,484 A | 10/1982 | Gertz et al. |
| 4,413,856 A | 11/1983 | McMahan et al. |
| 4,460,205 A | 7/1984 | Glance |
| 4,578,296 A | 3/1986 | Miyazaki et al. |
| 4,601,367 A | 7/1986 | Bongers |

(List continued on next page.)

FOREIGN PATENT DOCUMENTS

| | | |
|---|---|---|
| DE | 199 47 245 A1 | 4/2000 |
| EP | 56131849 | 10/1981 |
| EP | 0 863 056 A1 | 9/1998 |
| GB | 2198074 A * | 6/1988 |
| WO | WO 00/01525 | 1/2000 |
| WO | WO 00/31434 | 6/2000 |

OTHER PUBLICATIONS

Supplementary European Search Report, Application No. EP 00 94 1232, Mar. 17, 2003.
International Search Report, Application No. PCT/US 02/37005, Mar. 31, 2003.

*Primary Examiner*—Michael Colaianni
(74) *Attorney, Agent, or Firm*—Brooks Kushman P.C.

(57) ABSTRACT

A method is provided for making an energy-absorbing assembly for decelerating an object that impacts the assembly. The assembly comprises a base and at least energy-absorbing module associated therewith. To provide predetermined energy-absorption characteristics, the at least one energy-absorbing module is formed from a group consisting of a first structure (A) and a second structure (B). Structure (A) is a metal lattice which supported by the base. Structure (B) comprises a plurality of recesses, each having a floor and a wall. Together, structures (A) and (B) and combinations thereof afford a user-determinable resistance to impact.

20 Claims, 11 Drawing Sheets

U.S. PATENT DOCUMENTS

| | | |
|---|---|---|
| 4,631,221 A | 12/1986 | Disselbeck et al. |
| 4,635,981 A | 1/1987 | Friton |
| 4,666,130 A | 5/1987 | Denman et al. |
| 4,670,995 A | 6/1987 | Huang |
| 4,720,261 A | 1/1988 | Fishwick et al. |
| 4,838,606 A | 6/1989 | Furubayashi et al. |
| 4,844,213 A | 7/1989 | Travis |
| 4,856,833 A | 8/1989 | Beekman |
| 4,858,606 A | 8/1989 | Hamlin |
| 4,890,877 A | 1/1990 | Ashtiani-Zarandi et al. |
| 4,904,008 A | 2/1990 | Glance |
| 4,909,661 A | 3/1990 | Ivey |
| 4,925,224 A | 5/1990 | Smiszek |
| 4,941,701 A | 7/1990 | Loren |
| 4,951,986 A | 8/1990 | Hanafusa et al. |
| 5,030,501 A | 7/1991 | Colvin et al. |
| 5,033,593 A | 7/1991 | Kazuhito |
| 5,141,279 A | 8/1992 | Weller |
| 5,150,935 A | 9/1992 | Glance et al. |
| 5,165,990 A | 11/1992 | Nakano |
| 5,192,157 A | 3/1993 | Laturner |
| 5,198,175 A * | 3/1993 | Kato et al. .................. 264/512 |
| 5,225,213 A * | 7/1993 | Brown et al. ............... 264/153 |
| 5,282,288 A | 2/1994 | Henson |
| 5,306,066 A | 4/1994 | Saathoff |
| 5,364,682 A | 11/1994 | Tanaka et al. |
| 5,382,051 A | 1/1995 | Glance |
| 5,399,406 A | 3/1995 | Matsuo et al. |
| 5,425,561 A | 6/1995 | Morgan |
| 5,431,463 A | 7/1995 | Chou |
| 5,435,619 A | 7/1995 | Nakae et al. |
| 5,493,791 A | 2/1996 | Kramer |
| 5,500,037 A | 3/1996 | Alhamad |
| 5,518,802 A | 5/1996 | Colvin et al. |
| 5,573,272 A | 11/1996 | Teshima |
| 5,595,003 A | 1/1997 | Snow |
| 5,636,866 A | 6/1997 | Suzuki et al. |
| 5,660,426 A | 8/1997 | Sugimori et al. |
| 5,700,545 A | 12/1997 | Audi et al. |
| 5,727,826 A | 3/1998 | Frank et al. |
| 5,731,062 A | 3/1998 | Kim et al. |
| 5,732,801 A | 3/1998 | Gertz |
| 5,746,419 A | 5/1998 | McFadden et al. |
| 5,759,594 A * | 6/1998 | Masui et al. ................ 156/268 |
| 5,762,392 A | 6/1998 | Suga |
| 5,769,003 A | 6/1998 | Rose et al. |
| 5,799,991 A | 9/1998 | Glance |
| 5,836,641 A | 11/1998 | Sugamoto et al. |
| 5,932,316 A * | 8/1999 | Cree et al. .................. 428/174 |
| 5,950,835 A | 9/1999 | Moser et al. |
| 5,958,326 A * | 9/1999 | Caferro ...................... 264/1.9 |
| 5,972,477 A | 10/1999 | Kim et al. |
| 6,000,738 A * | 12/1999 | Stewart et al. .............. 293/102 |
| 6,012,764 A | 1/2000 | Seksaria et al. |
| 6,017,084 A | 1/2000 | Carroll, III et al. |
| 6,099,055 A * | 8/2000 | Hirota et al. ............... 293/120 |
| 6,199,942 B1 | 3/2001 | Carroll, III et al. |
| 6,247,745 B1 | 6/2001 | Carroll, III et al. |
| 6,443,513 B1 | 9/2002 | Glance |

* cited by examiner

METHOD FOR MAKING A MODULAR ENERGY-ABSORBING ASSEMBLY

CROSS REFERENCE TO RELATED APPLICATION

This application is a continuation-in-part of patent application Ser. No. 09/328,196 filed Jun. 8, 1999, now U.S. Pat. No. 6,199,942 which is a continuation-in-part of patent application Ser. No. 09/018,666; filed on Feb. 4, 1998 (now U.S. Pat. No. 6,017,084), the disclosures of which are incorporated herein by reference.

TECHNICAL FIELD

This invention relates to a method for making a modular energy-absorbing member for decelerating an object that impacts the member or the assembly in which the member is placed.

BACKGROUND ART

In many fields it is desirable to provide assemblies which are able to decelerate, in a given, limited distance, an object which impacts the assembly. To do so, the assembly must absorb a significant percentage of the impact energy transferred by the object. In the past, this has been accomplished physically by providing the assembly with an energy-absorbing member for supporting deformation of the assembly in order to absorb the energy of the impacting object. Alternative approaches are exemplified by commonly owned U.S. Pat. No. 5,700,545; U.S. Ser. No. 09/018,666, filed on Feb. 4, 1998 (now U.S. Pat. No. 6,017,084); and U.S. Ser. No. 09/328,196, filed on Jun. 8, 1999, incorporated herein by reference.

Within a vehicle, for example, occupants require protection from impact with interior components such as the pillars and headrails. These structures are typically made of steel tubing or steel channels which are welded together to form the structural cage or unitized body for the vehicle. Designers have attempted to place energy-absorbers over the pillars, headrails and other parts of a vehicle to protect the vehicle occupants. Prior art approaches are found in the use of energy-absorbing urethanes, rigid polymeric foams, blocks or cells or vanes of engineered plastics, various sheet metal configurations, metal beams, honeycombed metal, and other geometric solids. Most of these materials, however, while crushing generally absorb less than the desired amount of energy for a given displacement.

The desired response of an energy-absorbing material from initial loading to failure is one wherein a near "square wave" response of force versus deflection is produced, such that the force exerted on the decelerated object is nearly unchanged over a desired range of crush distance or deflection. Commonly owned U.S. Pat. No. 5,700,545 issued to Audi et al. discloses such an energy-absorbing structure. The energy-absorbing member disclosed therein comprises an array of material, such as expanded metal, configured with vertical supporting faces which are generally orthogonal to spacing faces lying in the plane of an incident surface. While the energy-absorption characteristics of such a structure are improved compared with those of the prior art, due to its configuration only the supporting faces, representing ~50% of the absorbing member, are utilized in energy-absorption. The spacing faces play little or no part in energy-absorption since they generally lie in a plane orthogonal to the direction of impact.

Therefore, a need exists for providing a method for making an energy-absorbing assembly which maximizes the use of energy-absorbing members, so that maximum collapsible material is harnessed to produce superior energy-absorbing characteristics and optimize the amount of energy-absorbed per unit mass and per unit deflection of the energy-absorbing member, compared with prior art structures.

The amount of energy that is desired to be absorbed by the absorbing assembly depends on the kinetic energy of the object to be decelerated and the deflection of the background structure when impacted by the object. In the case of automotive interiors, the automobile body or cage deflects to a degree when impacted by occupants. The degree of deflection varies through the vehicle cage for a given amount of impact energy. So the energy-absorbing structure is required to absorb different amounts of energy at different locations in the vehicle. The amount of crush space available also varies.

Thus, it would be desirable, additionally to provide a method for making a modular energy-absorbing assembly wherein constituent modules offer different degrees of resistance to impact forces. Further, it would be useful to provide such a module wherein the material which supports each module is itself formed from an energy-absorbing structure.

SUMMARY OF THE INVENTION

It is an object of the present invention to provide a method for making a modular energy-absorbing assembly which decelerates an impacting object in a given, limited distance after engagement with the assembly, wherein various modules or areas of the assembly offer different degrees of resistance to impact forces, thereby allowing the designer to customize the assembly according to the requirements of the environment in which it is deployed.

It is another object of the present invention to form holders integral in the assembly in which wires, tubes, ducts, etc. may be placed without the need to use additional attachments such as clips, adhesives, etc.

It is a further object of the present invention to provide a method for making an energy-absorbing assembly that maximizes the energy-absorption over a given distance as compared with prior art structures, while affording economies in manufacturing.

It is a still further object of the present invention to provide a method for making an energy-absorbing assembly which absorbs energy in a near square-wave manner.

It is another object of the present invention to provide a method for making an energy-absorbing assembly which is adapted for mounting on a vehicle in order to provide impact protection.

Accordingly, a method for making a thermoformed energy-absorbing assembly is provided for decelerating an object that impacts the assembly. The assembly includes a base and at least one energy-absorbing module associated with the base for accommodating deformation of the assembly. The at least one energy-absorbing module comprises a structure selected from the group consisting of a first structure, termed herein as structure (A) and a second structure, termed herein as structure (B). Structure (A) comprises a lattice of interconnected strands, the strands intersecting to define a plurality of cells and being supported within a channel formed within the base. The structure (A) is oriented such that the plane of each cell is substantially parallel to the impacting force in order to maximize energy-absorption over a given distance. The lattice collapses and at least some of the cells become at least partially closed during energy-absorption.

The modules may be separate pieces or modular sections or merely areas of the same piece may be designed with varying absorbing characteristics between them. Alternatively, each piece may be designed to have the same absorbing characteristics. Pieces of different designs may then be placed next to or in close proximity to each other to afford a generally continual energy-absorbing function.

Structure (B) includes a plurality of cup-or other-shaped recesses, each having a floor and a frusto-conical wall defined within the base. The structure (B) is oriented such that the floor of each cup is substantially orthogonal to the impacting force. Its frusto-conical wall is substantially parallel to the impacting force in order to maximize energy-absorption by the wall over a given distance. The wall at least partially collapses and at least some of the cups become at least partially compressed during energy-absorption. The shape of the cups in the structure (B) in the plan view may be circular, oval, triangular, hexagonal or any other polygonal shape.

Structures (A) and (B) afford the designer a user-determinable resistance to impacting forces.

The above objects and other objects, features, and advantages of the present invention are more readily understood from a review of the attached drawings and the accompanying specification and claims.

BRIEF DESCRIPTION OF THE DRAWINGS

FIG. 7 is a force-deflection graph for the energy-absorbing member made according to the steps of the present invention in which the cells are aligned such that the minor axes are generally parallel to the direction of impact;

FIG. 13($a$) illustrates a plastic sheet from which the base is formed; the tool (FIG. 13($b$)), and a depiction of the finished part (FIG. 13($c$));

BEST MODES FOR CARRYING OUT THE INVENTION

Before turning to a disclosure of the manufacturing process steps practiced according to the teachings of the present invention, a disclosure will be first be made of the various products and their attributes made thereby.

Figure 1:
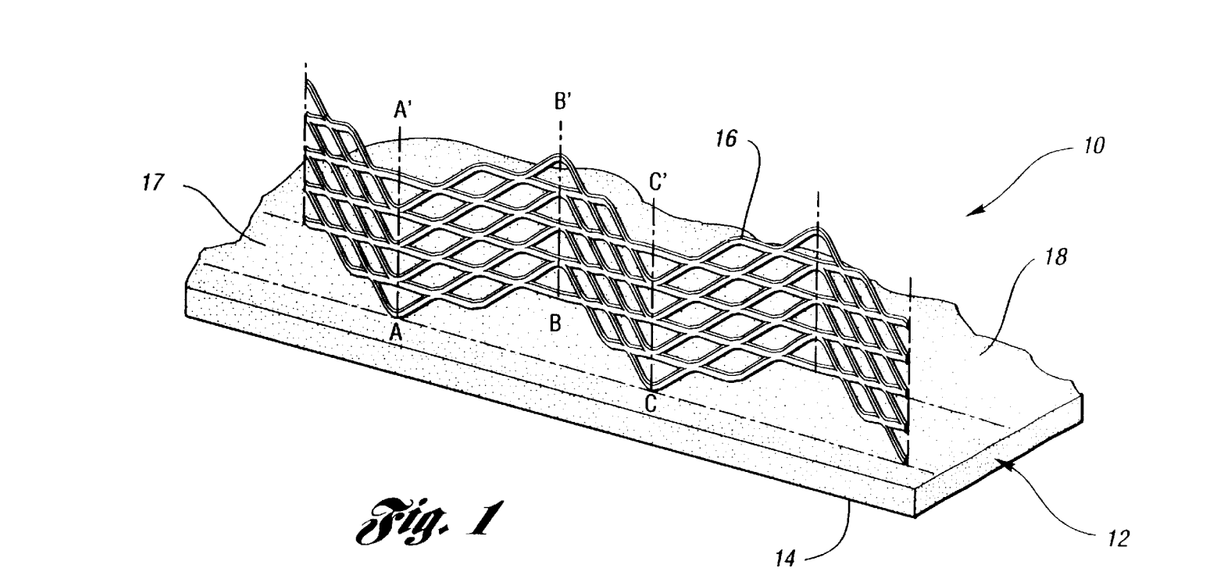
FIG. 1 depicts a perspective view of one member in one module of an energy-absorbing assembly made according to the method of the present invention.

Referring first to FIG. 1, there is depicted an energy-absorbing assembly 10 made according to the steps of the present invention, for decelerating an object (not shown) that impacts the assembly. In the preferred embodiment, assembly 10 comprises an incident member 12 having an incident surface 14 that meets the impacting object. At least one energy-absorbing member 16 is attached to an attachment region 17 of an opposing face 18 of incident member 12 for accommodating deformation of assembly 10.

Figure 2:
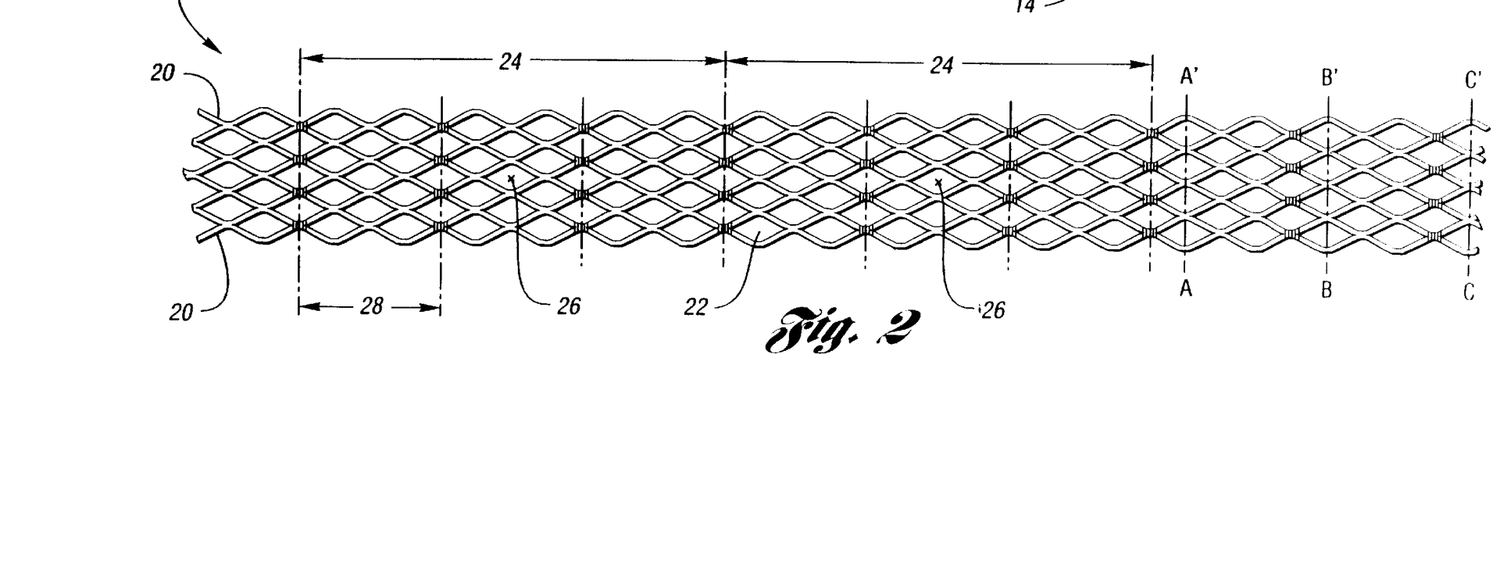
FIG. 2 is a side elevational view of a planar embodiment of one member of the present invention depicted in FIG. 1.

Referring now to FIG. 2, each energy-absorbing member 16 comprises a lattice of interconnected strands 20 of a material, such as expanded metal, which provides assembly 10 with the characteristic energy-absorption. The expanded metal from which energy-absorbing member 16 is preferably formed is available from sources such as the McNichols Company of Tampa, Fla. The material is available in numerous styles and can be constructed of various materials, depending upon the desired energy-absorption characteristics of assembly 10. Representative materials include carbon steel, ASTM-F-1267-9-1, HD galvanized steel, aluminum (5005 H 34), stainless steel type 304, stainless steel type 316,and the like. If desired, a protective coating can be applied to the expanded metal to provide corrosion resistance.

Alternatively, the lattice could be composed of any form of steel, plastic, or composite material. It will be apparent to those skilled in the art that the lattice could be formed by perforating, expanding, burning, punching, laser cutting, or blanking a sheet. The lattice could be formed by molding, casting, or other solidification processes, or by welding, brazing, or other joining processes. Following lattice formation, energy-absorbing member 16 is preferably flattened by stamping, roll-forming, or other similar processes. Accordingly, the term "lattice" is meant to encompass these and their equivalent structures.

Strands 20 within energy-absorbing member 16 intersect to define a plurality of cells 22 (FIG. 2). Cells 22 are preferably diamond-shaped before impact of the object, but cells 22 may be pie-shaped or polygonal, having any number of sides, with the sides being curved or straight. The lattice structure is preferably configured to be 1–5 cells in height. In the preferred embodiment, energy-absorbing member 16 is oriented such that the plane of each cell 22 is substantially perpendicular to attachment region 17 (best shown in FIG. 1), as illustrated by lines A–A', B–B', and C–C'. Using such a configuration, each cell may be effective in absorbing impact energy. The terminology "substantially perpendicular" is used to indicate the possible necessity of canting the energy-absorption member 16, up to about 45 degrees, to compensate for curvature in incident member 12.

Figure 3:
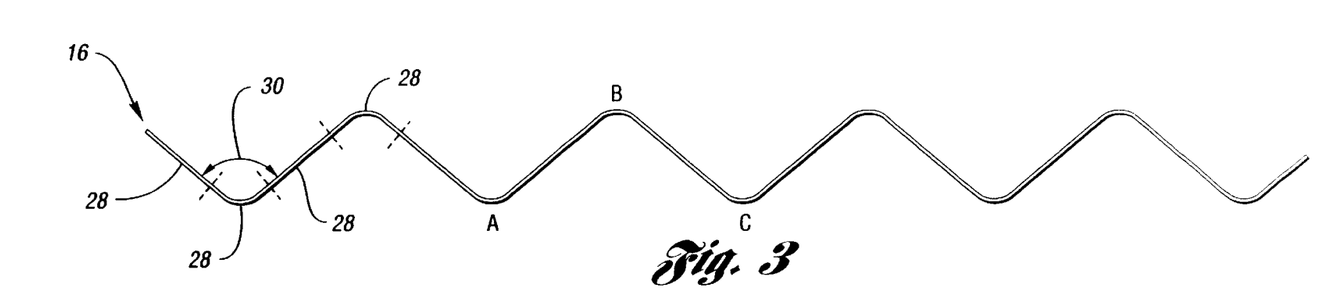
FIG. 3 is a top plan view of a serpentine embodiment of the one member of the present invention depicted in FIG. 1.

Still referring to FIG. 2, the lattice structure of energy-absorbing member 16 comprises a plurality of interconnected sectors 24, wherein each sector 24 has a center point 26. Sectors 24 may be coplanar, as depicted in FIG. 2, or may lie in different planes to form sawtooth, squared, serpentine, or any other type of configuration of energy-absorbing member 16. Each sector 24 further includes a plurality of interconnected segments 28, which may be planar or curvilinear in form, as shown in FIG. 3. Planar and curvilinear segments are joined to form a preferred, generally serpentine configuration of energy-absorption member 16. Points A, B, and C denoted in FIG. 3 correspond with points A, B, and C shown in FIG. 1. For a given curvilinear segment 28, the angle 30 within the segment may vary between about 0 and 180 degrees.

Figure 4:
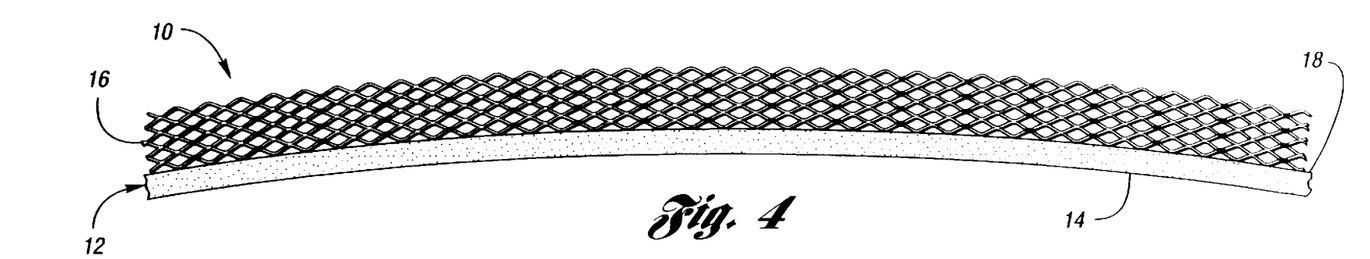
FIG. 4 is a side view of a planar embodiment of the energy-absorbing member as it is deformed in a plane perpendicular to the incident surface.
Figure 5:
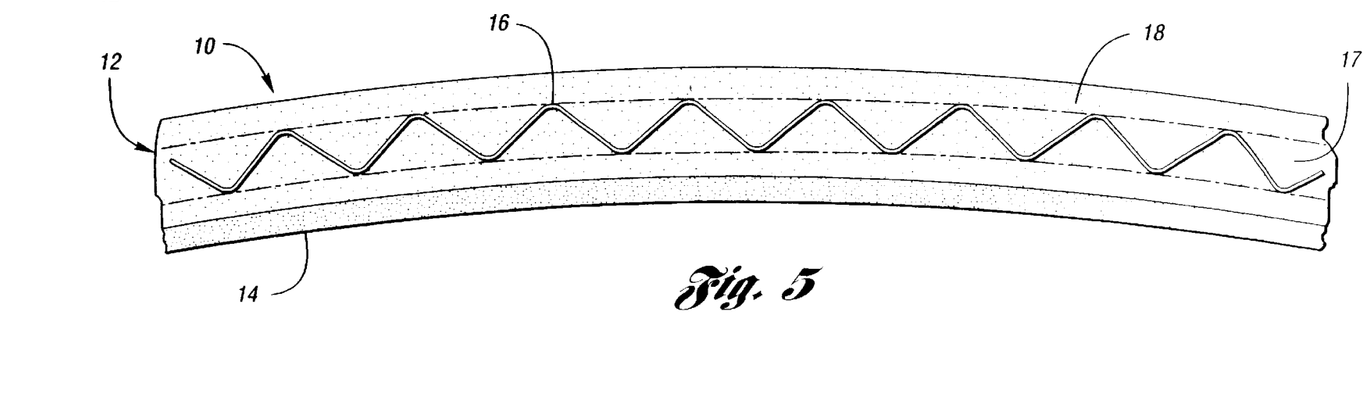
FIG. 5 is a top view of a serpentine embodiment of the energy-absorbing member as it is deformed in a plane parallel to the incident surface.

As depicted in FIG. 4, any embodiment of energy-absorbing member 16 may be deformed within a plane which is substantially perpendicular to incident surface 14, in order to conform to the curvature of incident member 12, which in some cases, may not be perfectly flat. Similarly, any configuration of energy-absorbing member 16 may also be deformed within a plane which is substantially parallel to incident surface 14, as illustrated by the top view of FIG. 5.

Figure 6:
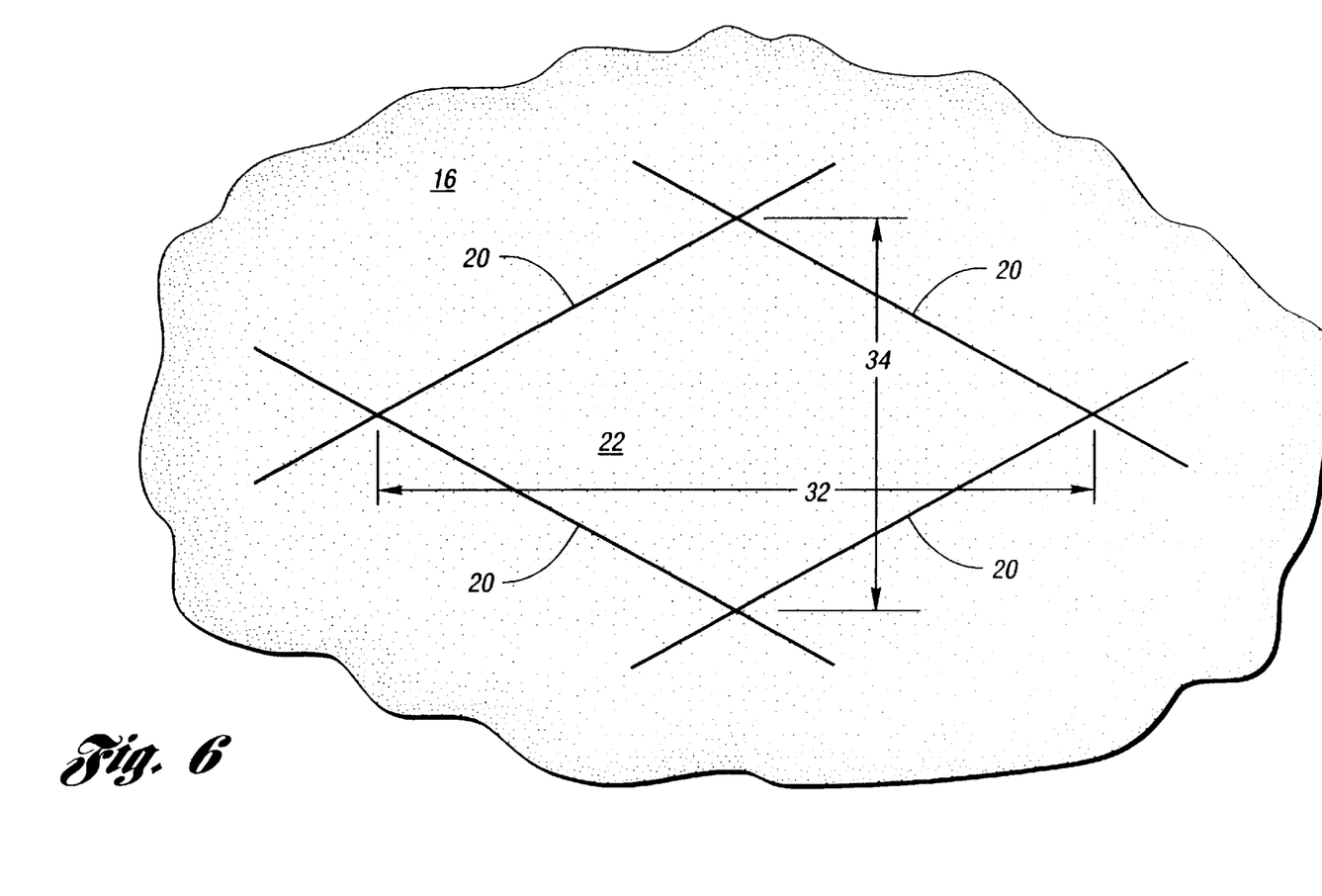
FIG. 6 is an enlarged, fragmentary view of a single cell within the energy-absorbing member of the present invention.

Referring now to FIG. 6, a representative cell 22 within energy-absorbing member 16 is shown. Each cell 22 is defined by a major axis 32 and a minor axis 34, wherein major axis 32 is longer than minor axis 34. In the preferred embodiment, each cell 22 is oriented such that its minor axis 34 is substantially perpendicular to incident surface 14 and its major axis 32 is substantially parallel to incident surface 14, for reasons to be explained below.

The cells 22 within the lattice cooperate to provide a concatenated, progressive reaction to the impact forces generated by a collision of an object with energy-absorbing assembly 10. As compression proceeds, the cells 22 become flattened in an analogous manner to that of the bellows of an accordion upon being squeezed. Ultimately, however, the lattice is no longer able to absorb the impact force. At that point, cells 22 become collapsed, and energy-absorbing member 16 yields like a collapsing column. Nevertheless, during energy-absorption the reaction to the impact forces has remained substantially constant during compression of the lattice, as will be shown below.

Figure 8:
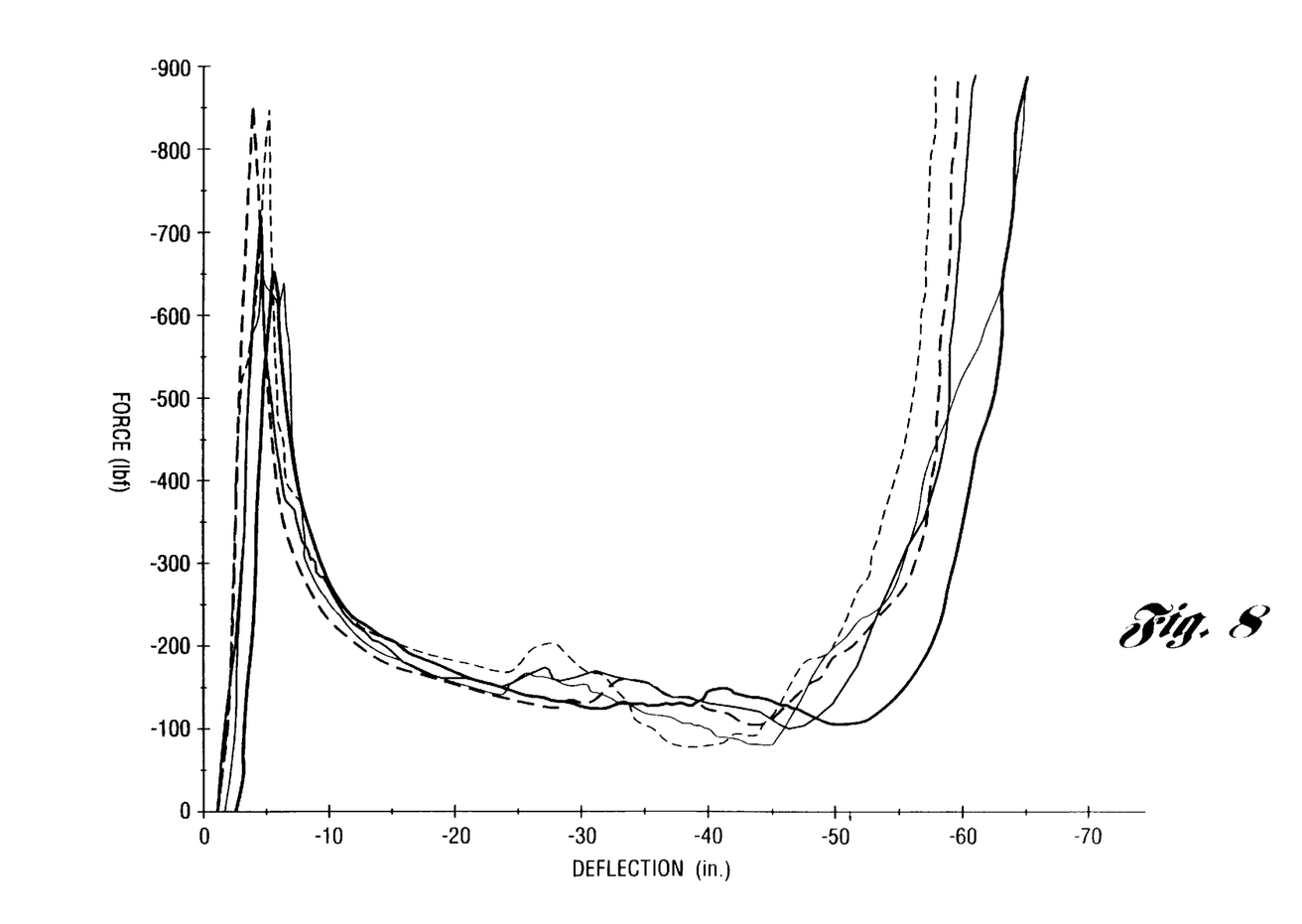
FIG. 8 is a force-deflection graph for the energy-absorbing member made according to the steps of the present invention in which the cells are aligned such that the major axes are generally parallel to the direction of impact.

FIGS. 7 and 8 show force-deflection curves for samples of energy-absorbing member 16, wherein member 16 is composed of 3/16'-22 gage flattened expanded metal, member 16 is arranged in a serpentine configuration, and cells 22 are diamond-shaped. In FIG. 7, energy-absorbing member 16 was oriented such that minor axis 34 was generally parallel to the direction of impact. As shown, the force absorbed by energy-absorbing member 16 per unit of displacement rises upon impact, then remains substantially constant over a displacement during compression of over 50% of the original height of the energy-absorbing lattice. Thus, the force-deflection curves assume a near square wave characteristic, as indicated by their average shape factor of 0.8 or higher. It is desirable that the force-deflection curve have somewhat rounded corners, so that the object is not instantaneously accelerated or decelerated by the impacting force.

In FIG. 8, energy-absorbing member 16 was oriented such that major axis 32 was generally parallel to the direction of impact. It can be seen these curves do not exhibit a near square wave characteristic, which is indicated by their average shape factor of 0.4 or lower. Furthermore, the force "spike" present in each curve can adversely decelerate the object, and increase the potential for damage or bodily injury. Therefore, the orientation of cells 22 wherein minor axis 34 is substantially parallel with the direction of impact constitutes the preferred embodiment of the present invention.

In the preferred embodiment of the products made by the disclosed method, the energy-absorbing assembly 10 also includes means for attaching the incident member to a support surface, such as a pillar or headrail of a vehicle. Attachment means include glue, insert molding, press fits, snap fits, heat staking, fasteners, welding, brazing, or other metal joining methods.

Figure 9:
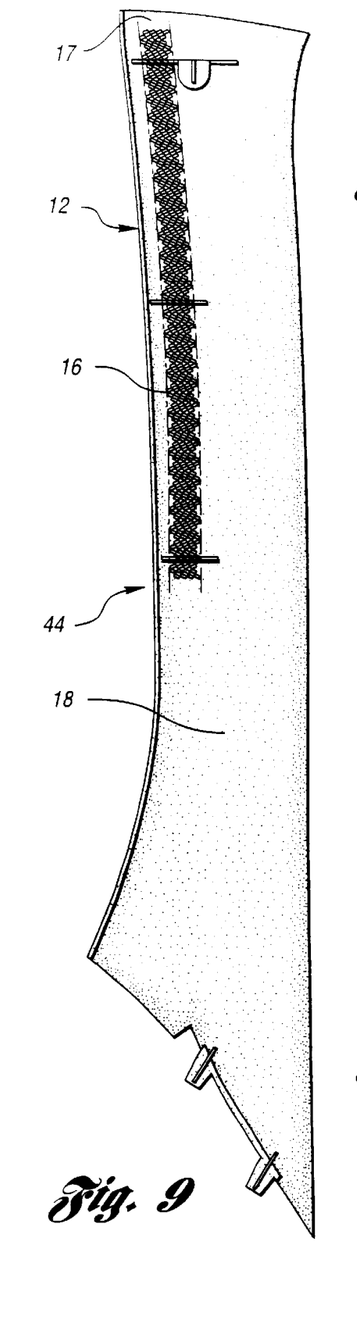
FIG. 9 shows an energy-absorbing member made according to the steps of the present invention, attached to a typical vehicle A pillar cover.
Figure 10:
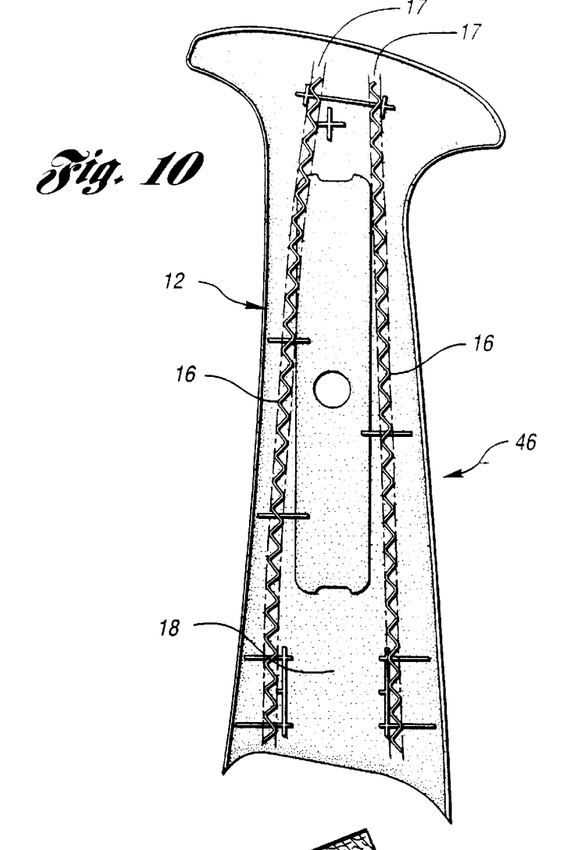
FIG. 10 shows an energy-absorbing member made according to the steps of the present invention, attached to a typical vehicle B pillar cover.

FIGS. 9 and 10 show examples of energy-absorbing member 16 attached to the attachment region 17 of a vehicle A pillar cover 44 and a vehicle B pillar cover 46, respectively. The vehicle B pillar extends upwardly to the roof at a location just behind the front door on both sides of a vehicle. While energy-absorbing member 16 is shown placed in a generally vertical direction on A pillar cover 44 (FIG. 8) and B pillar cover 46 (FIG. 9), energy-absorbing member 16 may be placed in other orientations.

Figure 11:
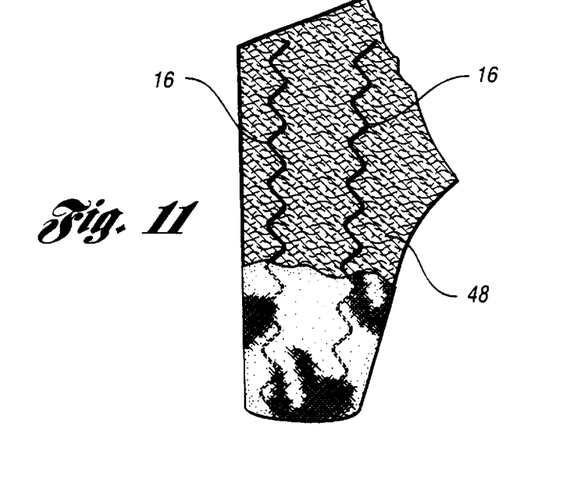
FIG. 11 shows an energy-absorbing member made according to the steps of the present invention, enveloped within a filler material.

FIG. 11 depicts energy-absorbing members 16 disposed at least partially within a filler material 48, such as a polymeric material, a foam, a gas, or mixtures thereof. Such a configuration might be utilized to protect a vehicle headrail, which is attached to the tops of the vehicle A and B pillars to form the perimeter of the roof of the vehicle. Impregnation of such substances within energy-absorbing assembly 10 may improve wall buckling resistance. Various materials may also be placed interstitially within energy-absorbing assembly 10 to provide rebound, including metal springs and polymers exhibiting elasticity.

Figure 12:
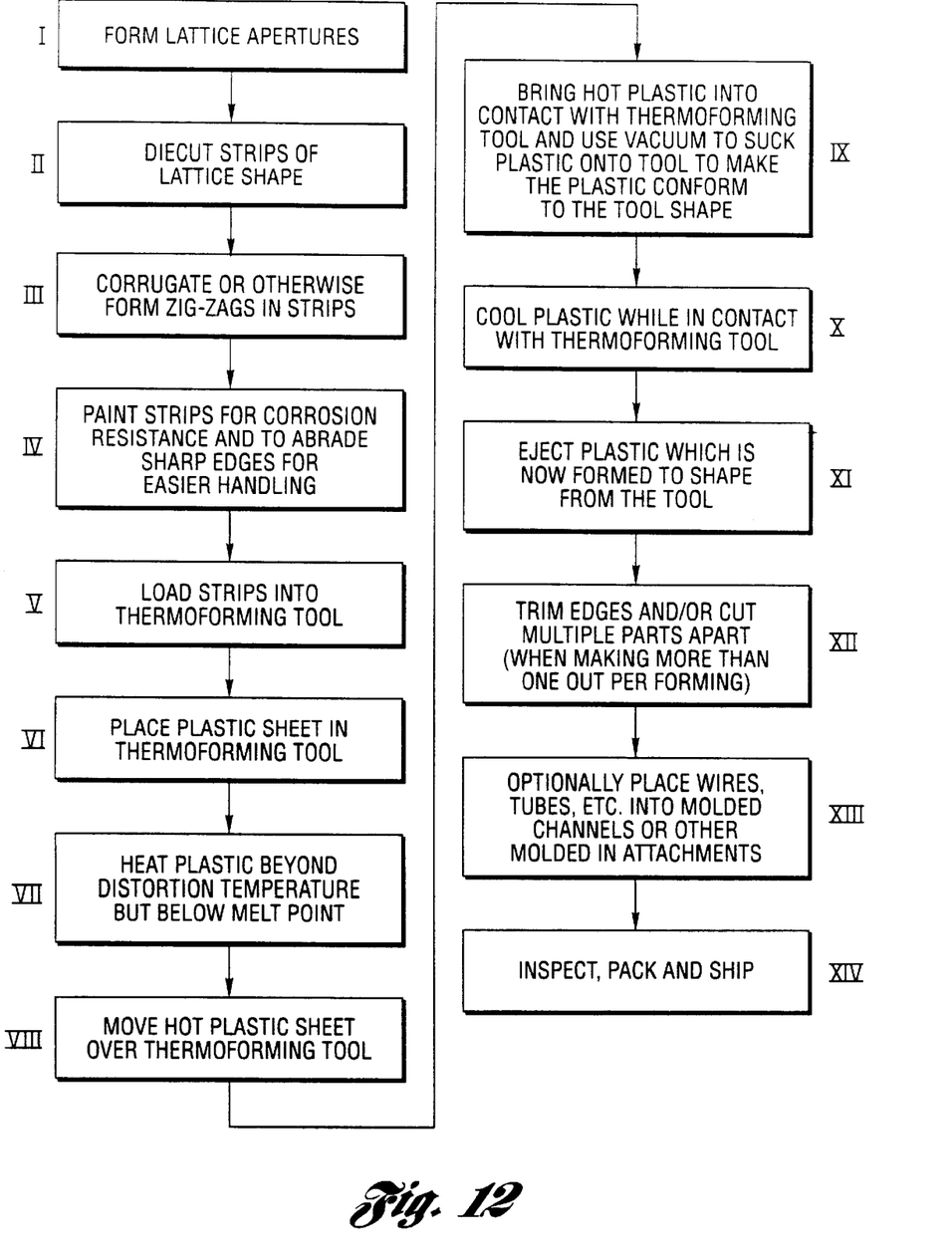
FIG. 12 is a schematic diagram of the main steps in the manufacturing process for making the modular energy-absorbing assembly.
Figure 13A:
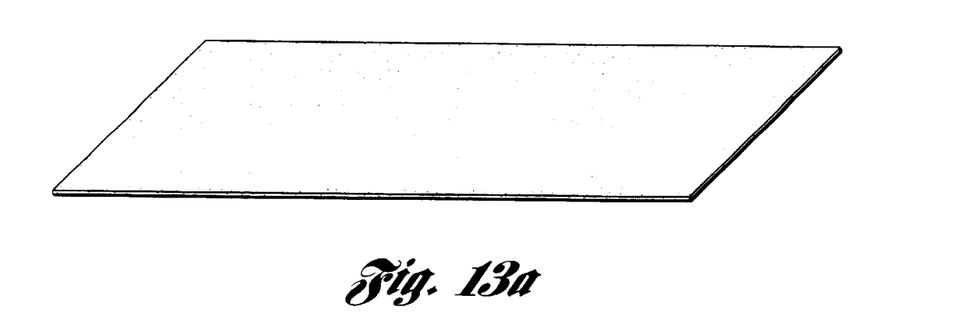
Figure 13B:
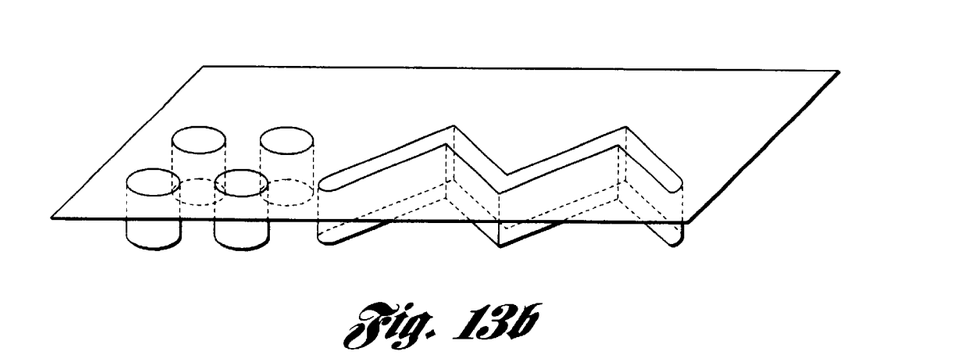

FIG. 12 depicts the main steps involved in the manufacturing process of the modular energy-absorbing assembly. Steps I and II involve forming the lattice apertures, followed by strips of the lattice being prepared in a desired shape by a process such as die cutting. Next (Step III), the strips are corrugated into a zig-zag, sinusoidal or other configuration, or other patterned recesses. Optionally (Step IV), the strips may be painted for corrosion or otherwise treated for corrosion resistance and sharp edges can be dulled by abrasion for ease of handling. In Step V, the strips are loaded into a thermoforming tool, which is depicted in FIG. 13(b).

In Step VI, a plastic sheet is placed into the thermoforming machine. The plastic is then heated beyond its distortion temperature but below its melting point (Step VII).

Next, (Step VIII), the hot plastic sheet is moved over the thermoforming tool. In Step IX, the hot plastic is brought into contact with the thermoforming tool and a vacuum is applied to draw the plastic onto the tool to make the plastic conform to the tool's shape. Optionally, this step can be practiced by using an implement to urge the plastic sheet onto the thermoforming tool to assist in the drawing step. Alternatively, a positive pressure can be applied by a fluid medium to the side of the plastic sheet opposite from that which is in contact with the thermoforming tool to promote conformance of the sheet with the tool.

The plastic is then cooled (Step X) while in contact with the thermoforming tool. The plastic is then ejected (Step XI) which now has assumed the shape of the tool. Edges are then trimmed (Step XII) and/or cut so that multiple parts may be formed (making more than one structure in the forming operation). Optionally (Step XIII) wires, tubes, etc, may be placed in channels, snap fits, recesses, or other attachments molded into the structure as it is thermoformed. Finally, (Step XIV) the product is inspected, packed, and shipped.

Figure 13C:
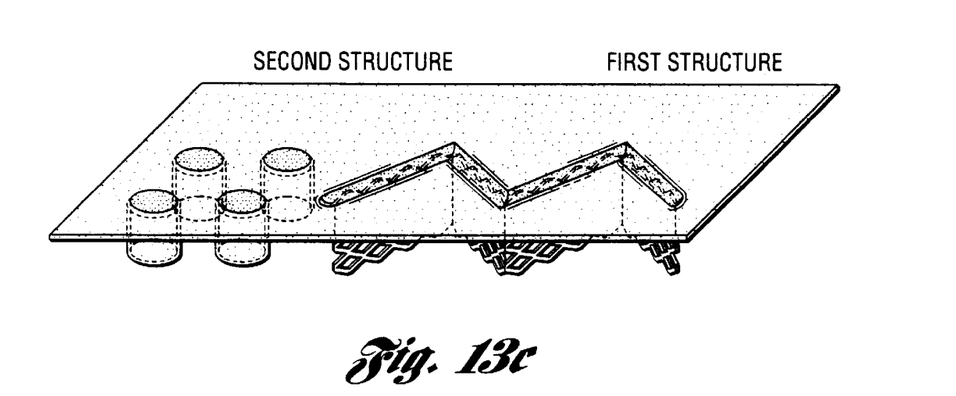
Figure 14:
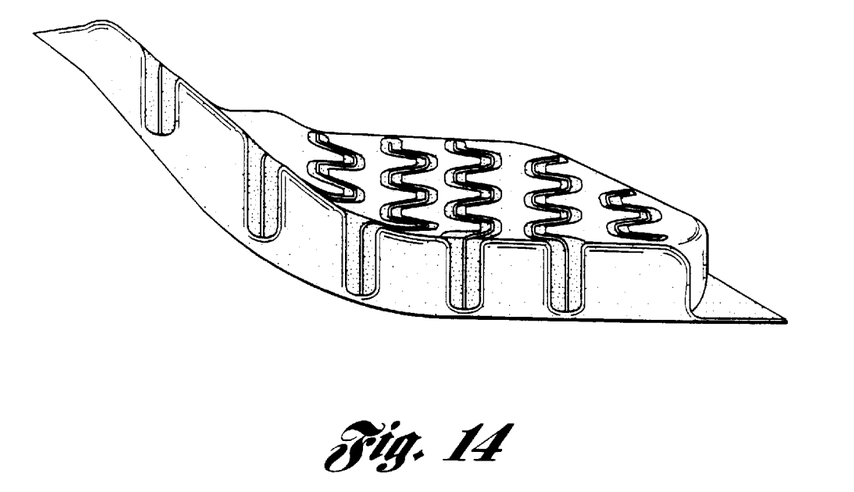
FIG. 14 is a perspective view of an underside of an energy-absorbing module made according to the steps of the present invention, as embodied in the first structure.
Figure 15:
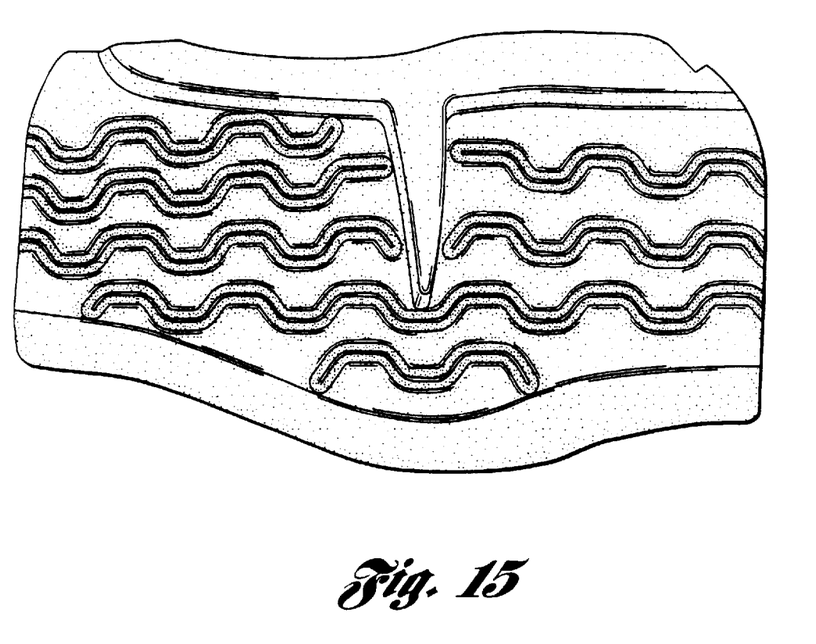
FIG. 15 is a top view of the structure depicted in FIG. 14.
Figure 16:
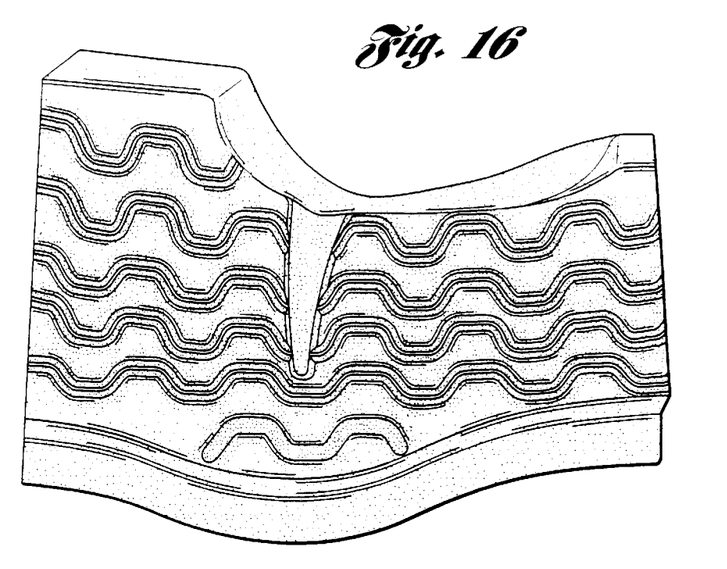
FIG. 16 is a bottom view of the structure depicted in FIGS. 14–15.
Figure 17:
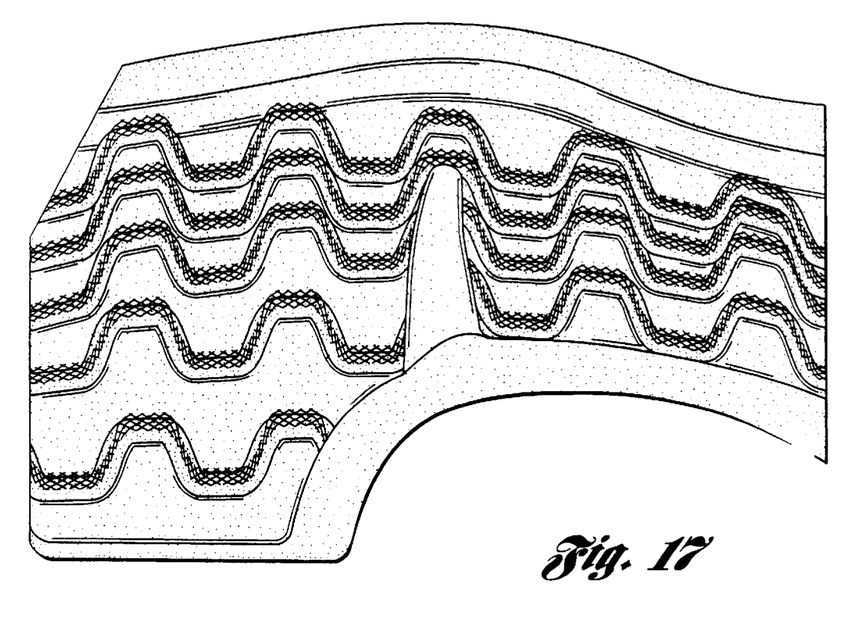
FIG. 17 is a top view of the structure depicted in FIGS. 14–16.

In FIG. 13(c), there is depicted a metal lattice of expanded metal which is inserted into female zig-zag depressions or channels defined within the thermoforming tool (FIG. 13(b)). These channels are generally shaped depicted as in FIG. 13b. The long rectangular cross-section holds most of the energy-absorbing member. The wider area, which can be shaped in a multitude of ways, serves to allow the thermoformed plastic to flow around the absorbing member and hold it in place. In FIG. 13(c), the recesses may usefully interconnected by ribs (not shown). If desired, the recesses could be deployed so their centers lie at the intersections of walls forming a hexagon in the plan view and ribs may be formed between each recess. This would result in an essentially honeycomb shape. The energy-absorbing assembly of the present invention is a structure having a nominal thickness between 7 and 25 millimeters for automotive head impact application. It absorbs energy more efficiency, is light in weight and less expensive to manufacture and molded rigid polyurethane foam. One embodiment of the finished part (structure A) made according to the method of this invention is depicted in FIGS. 14–17.

Figure 18:
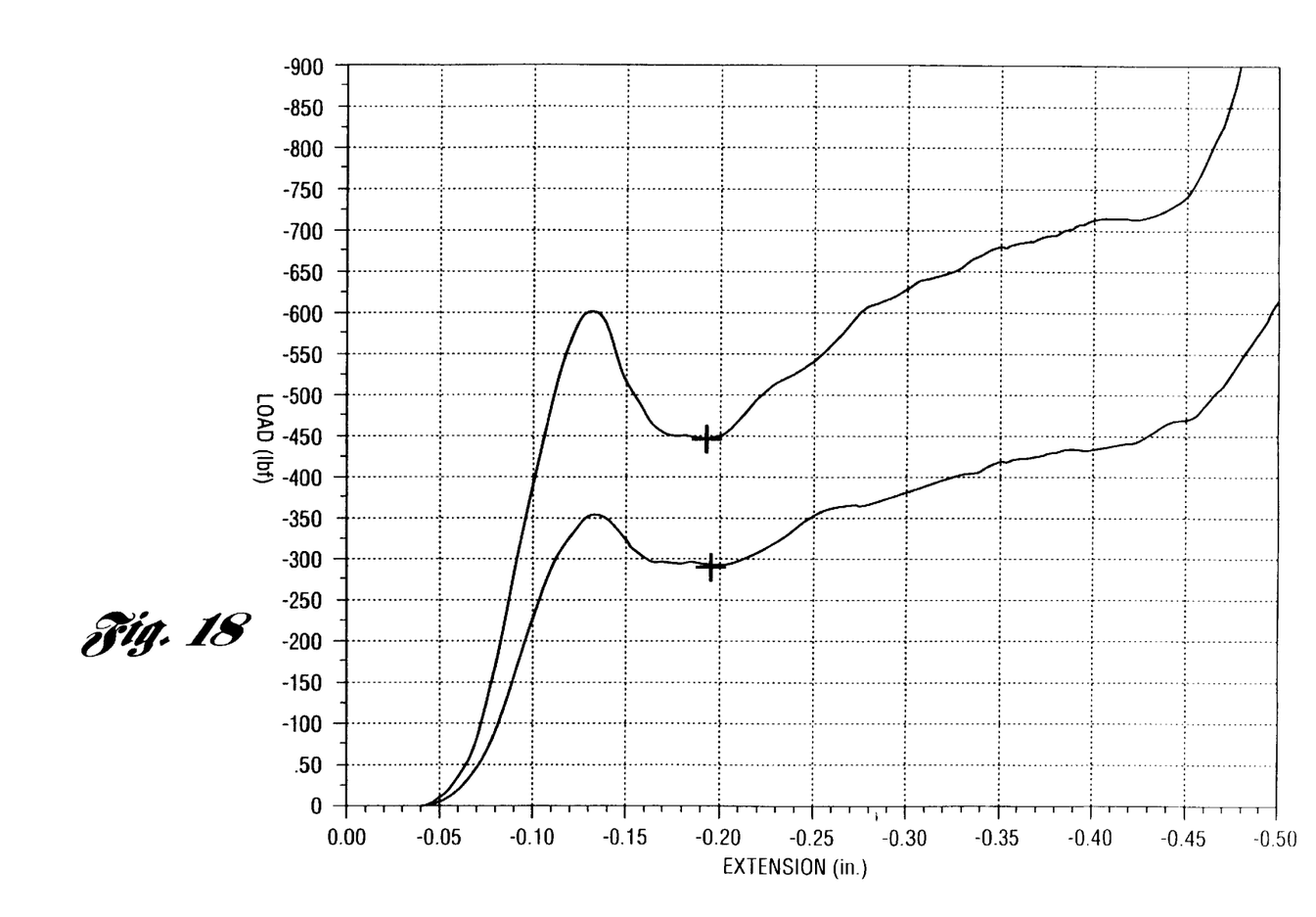
FIG. 18 is a force-deflection curve for a module of the energy-absorbing member, wherein the module includes cup-shaped recesses, each having a floor and a frusto-conical wall defined within a base.

FIG. 18 illustrates load-deflection characteristics of structure (B). It is noted that this shape factor is not as near 1.0 as is the case of metal lattice. However, the shape is generally square enough to afford energy-absorption.

The base of the modular energy-absorbing assembly comprises a thermoformed resin. Suitable materials include a polypropylene co-polymer, e.g. Shulman Polytrope TPP 524-31, Rhe TECH HP 509, Amoco 6015,; ABS (GE Cyclolas ZA5, Multibase ABS 802) polyester (DuPont Rynite 415 HP, Hoechst Impet 540), Nylon (Custom Resins CRI NX1170-RV200, Monsanto Vydyne 66B, e.g.,), Polycarbonate (Dow Califre 302-E, Miles Makralon 6653) or thermoplastic elastomer (Himont HiFax RTA 3362-E, DuPont Alcryn ALC2060UT).

Preferably, the plastic resin of choice is thermoplastic with a melt point below about 400° F., which permits plastic deformation and thermoforming. Also, the resin of choice should have a heat distortion temperature, i.e. temperature of which the plastic softens significantly, in excess of about 190–240° F. so that the part will perform over the range of temperatures of the interior of an automobile. Also, the resin of choice should have an IZOD impact strength which is as high as possible, a flex modulus in excess 250,000 psi to resist bending; and have an elongation at break of greater than 10–15% to allow plastic deformation, rather than brittle failure.

If desired, the base may define not only cup-shaped recesses, and a channel for supporting the lattice, but also ducts or linear channels for accommodating electrical wire, drain tubes, bumper fascia, air-bags, housings, fasteners (such as clips and snaps) and the like. Optionally, the step of forming recesses may comprise defining projections from the plastic sheet for forming one or more attachment members so that the cooled plastic sheet can be detachably attached to a mounting surface. If desired, the step of forming recesses may comprise forming one or more hinges in the plastic sheet to allow the plastic sheet to be bent in a controlled manner at one or more preferential locations. The step of forming recesses may also comprise defining one or more locators to allow the plastic sheet to be placed in registration with jigs or fixtures, or ducts that may form fluid conduits for liquids and/or air.

It would be appreciated that the step of bringing the plastic sheet into contact with the thermoforming tool may involve using an implement to urge the plastic sheet onto the thermoforming tool to assist in a vacuum drawing step, or the use of positive fluid-generated pressure.

In some environments, it may be desirable to place the plastic sheet adjacent to one or more material layers before placing the plastic sheet into the thermoforming tool. Optionally, one or more sheets may be placed on either side of the plastic sheet while the heated sheet is sufficiently hot to thermally bond the sheets thereto. It will be appreciated that the additional sheets may be bonded by such steps as adhesive bonding, dielectric bonding, explosive bonding, ultrasonic bonding, mechanical attachment, and the like.

As an alternative way to practice the method of the present invention, prior to forming, one or more parts may be inserted into the thermoforming tool, which becomes secured by the heated sheet as it conforms to the tool. In conventional thermoforming processes, the wall thickness of a cup-shaped recess formed from a planar plastic sheet may have an average thickness which is less than that of the sheet. If desired, the method of making a modular energy-absorbing assembly according to the present invention can be practiced by providing a mold with a plurality of cavities for forming the recesses to be defined. Under this practice, the walls may be sized to impart selected energy-absorbing characteristics to the one or more energy-absorbing modules.

As used herein, the term "integrally molded" (with reference to recesses formed within the base), refers to one or more recesses, each of which is formed as a unit with the sheet from which the recesses are made.

Thus, the disclosed invention offers manufacturing efficiency as compared to deployment of a rigid urethane foam absorber of the same overall volume. The disclosed thermoform absorbing structure incurs tooling costs which may be up to an order of magnitude lower, and thus has a lower costs per piece. As compared to injection moldings, the disclosed thermoformed absorber carries a lower tooling cost.

What is claimed is:

1. A method for making a modular energy-absorbing assembly, comprising the steps of:

providing a thermoforming tool with a plurality of frustoconical recesses defined therein the tool forming recesses having an imperforate base;

heating a plastic sheet to a temperature between its distortion and melt points;

bringing the heated plastic sheet into contact with the thermoforming tool and forming the heated plastic sheet onto the tool in order to conform the former to the latter, thereby forming frustoconical recesses that extend from one side of the plastic sheet so that stress concentration surrounding abrupt changes in profile are substantially avoided, and defining a heated plastic part;

cooling the heated plastic part to define a cooled plastic part;

ejecting the cooled plastic part from the tool, so that the cooled plastic part retains the one or more frustoconical recesses integrally formed therein; and deploying the cooled plastic part in a location that may be subjected to incident energy that is to be at least partially absorbed so that such energy absorption is provided by the frustoconical recesses in the cooled plastic part unaided by a complementary energy absorber positioned adjacent thereto, at some of the frustoconical recesses becoming partially collapsed during energy absorption.

2. A method for making a modular energy-absorbing assembly, comprising the steps of:

provided a thermoforming tool with a plurality of recesses defined therein;

heating a plastic sheet to a temperature between its distortion and melt points;

bringing the heated plastic sheet into contact with the thermoforming tool and vacuum forming the heated plastic sheet onto the tool in order to conform the former to the latter, thereby forming recesses within the plastic sheet so that stress concentration surrounding abrupt changes in profile are substantially avoided, and defining a heated plastic part;

placing one or more objects at least partially into at least some of the recesses formed in the plastic part;

cooling the heated plastic part to define a cooled plastic part; and ejecting the cooled plastic part from the tool, wherein the step of placing one or more objects at least partially into at least some of the recesses formed in the cooled plastic part comprises selecting the object from the group consisting of fasteners, bumper fascia, electrical wire, tubes, air bags, and housings.

3. The method of claim 1, wherein the step of forming recesses comprises defining projections from the plastic sheet for defining one or more attachment members so that the cooled plastic part can be detachably attached to a mounting surface.

4. The method of claim 1, wherein the step of forming recesses comprises forming one or more hinges in the plastic sheet to allow the plastic sheet to be bent in a controlled manner at one or more preferential locations.

5. The method of claim 1, wherein the step of forming recesses comprises defining one or more locators to allow the plastic sheet to be placed into registration with jigs and fixtures.

6. The method of claim 1, wherein the step of forming recesses comprises forming cup-shaped recesses having a wall thickness that diminishes with distance from the plastic sheet for energy absorption.

7. The method of claim 1, wherein the step of forming recesses comprises forming at least some zig-zag shaped or sinusoidal or other patterned recesses for accommodating one or more energy-absorbing members.

8. A method for making a modular energy-absorbing assembly, comprising the steps of:

providing a thermoforming tool with a plurality of frustoconical recesses defined therein the tool forming recesses having an imperforate base;

heating a plastic sheet to a temperature between its distortion and melt points;

bringing the heated plastic sheet into contact with the thermoforming tool and vacuum forming the heated plastic sheet onto the tool in order to conform the former to the latter, thereby forming recesses primarily for energy absorption that extend from one side of the plastic sheet and defining a heated plastic part;

forming at least some linear channels for accommodating an object;

cooling the heated plastic part to define a cooled plastic part; and ejecting the cooled plastic part from the tool, so that the cooled plastic part defines one or more recesses and channels integrally formed therein.

9. A method for making a modular energy-absorbing assembly, comprising the steps of:

providing a thermoforming tool with a plurality of recesses defined therein;

heating a plastic sheet to a temperature between its distortion and melt points;

bringing the heated plastic sheet into contact with the thermoforming tool and vacuum forming the heated plastic sheet onto the tool in order to conform the former to the latter, thereby forming recesses within the plastic sheet and defining a heated plastic part;

placing one or more objects at least partially into at least some of the recesses formed in the cooled plastic part;

cooling the heated plastic part to define a cooled plastic part; and ejecting the cooled plastic part from the tool, so that the cooled plastic part defines one or more recesses integrally formed therein, wherein the step of forming recesses comprises forming ducts in the heated plastic part for the passage of fluids therethrough.

10. The method of claim 1, wherein the step of bringing the heated plastic sheet into contact with the thermoforming tool comprises using an implement to urge the plastic sheet onto the thermoforming tool to assist in a vacuum drawing step.

11. The method of claim 1, further comprising:

placing one or more material layers adjacent to the plastic sheet before placing the plastic sheet into the thermoforming tool, so that the one or more material layers become attached to the plastic sheet.

12. The method of claim 11, wherein the placing step includes:

placing one or more sheets on either side of the plastic sheet while the heated sheet is sufficiently hot to thermally bond the sheets thereto.

13. The method of claim 11, wherein the additional sheets are bonded by a step selected from the group of steps consisting of adhesive bonding, dielectric bonding, explosive bonding, ultrasonic bonding, and mechanical attachment.

14. A method for making a modular energy-absorbing assembly with a base and one or more energy-absorbing modules associated with the base, comprising the steps of:

providing a thermoforming tool with a plurality of recesses defined therein;

heating a plastic sheet to a temperature between its distortion and melt points;

inserting one or more parts into the thermoforming tool, which become secured by the heated sheet as it conforms to the tool;

bringing the heated plastic sheet into contact with the thermoforming tool and vacuum forming the heated plastic sheet onto the tool in order to conform the former to the latter, thereby forming recesses within the plastic sheet and defining a heated plastic part;

cooling the heated plastic part to define a cooled plastic part; and ejecting the cooled plastic part from the tool, so that the cooled plastic part defines one or more recesses integrally formed therein.

15. The method of claim 1, wherein the step of bringing the heated plastic sheet into contact with the thermoforming tool comprises applying a vacuum between the heated sheet and the tool.

16. The method of claim 1, wherein the step of bringing the heated plastic heat into contact with the thermoforming tool comprises applying pressure from an opposite side of the heated plastic sheet in relation to the tool in order to facilitate the forming, drawing, pressing, or conforming of the heated plastic sheet to the thermoforming tool.

17. The method of claim 1, further comprising the step of trimming the plastic sheet during or after the step of forming recesses therewithin.

18. The method of claim 1 wherein the step of bringing the heated plastic sheet in contact with the thermoforming tool also comprises urging the plastic sheet into the tool.

19. The method of claim 8 wherein the step of bringing the heated plastic sheet in contact with the thermoforming tool also comprises urging the plastic sheet into the tool.

20. The method of claim 14 wherein the step of bringing the heated plastic sheet in contact with the thermoforming tool also comprises urging the plastic sheet into the tool.

* * * * *